United States Patent [19]

Maikuma et al.

[11] Patent Number: 4,950,141

[45] Date of Patent: Aug. 21, 1990

[54] STANDING WELL POST TYPE CENTER MECHANISM IN TIRE PRESS

[75] Inventors: Yoshimata Maikuma, Kobe; Katsumi Ichikawa, Akashi, both of Japan

[73] Assignee: Kabushiki Kaisha Kobe Seiko Sho, Kobe, Japan

[21] Appl. No.: 414,363

[22] Filed: Sep. 29, 1989

[30] Foreign Application Priority Data

Oct. 17, 1988 [JP] Japan ................... 63-262525

[51] Int. Cl.$^5$ ............................... B29C 35/00
[52] U.S. Cl. ........................ 425/33; 425/36; 425/48; 425/52; 425/58
[58] Field of Search ............ 425/48, 58, 52, 53, 425/33, 36

[56] References Cited

U.S. PATENT DOCUMENTS

| 2,730,763 | 1/1956 | Brundage | 425/33 |
| 4,486,162 | 12/1984 | Hasegawa et al. | 425/48 |
| 4,846,649 | 7/1984 | Hasegawa et al. | 425/33 |

FOREIGN PATENT DOCUMENTS 865447 4/1961 United Kingdom ............ 425/36

*Primary Examiner*—Willard Hoag
*Attorney, Agent, or Firm*—Oblon, Spivak, McClelland, Maier & Neustadt

[57] ABSTRACT

Disclosed herein is a standing well post type center mechanism in a tire press which comprises a bladder well disposed vertically liftably in the center of the tire press, the bladder well comprising a bead ring at the upper end thereof, an upper clamp ring assembly for holding the upper end of a bladder, the upper clamp ring assembly disposed concentrically with the bladder well and being vertically liftable independently of the bladder well, and a lower clamp ring assembly concentrical with the upper clamp ring assembly and vertically liftable independently of the bladder well and the upper clamp ring assembly, wherein an air cylinder for lifting the upper clamp ring assembly is disposed liftably in the bladder well, the upper clamp ring assembly is fitted to the upper end of a piston rod in the air cylinder, the lower clamp ring assembly is fitted to the upper end of the air cylinder, and the lower end of the air cylinder is constrained engageably and disengageably through a stopper.

1 Claim, 6 Drawing Sheets

FIG. I
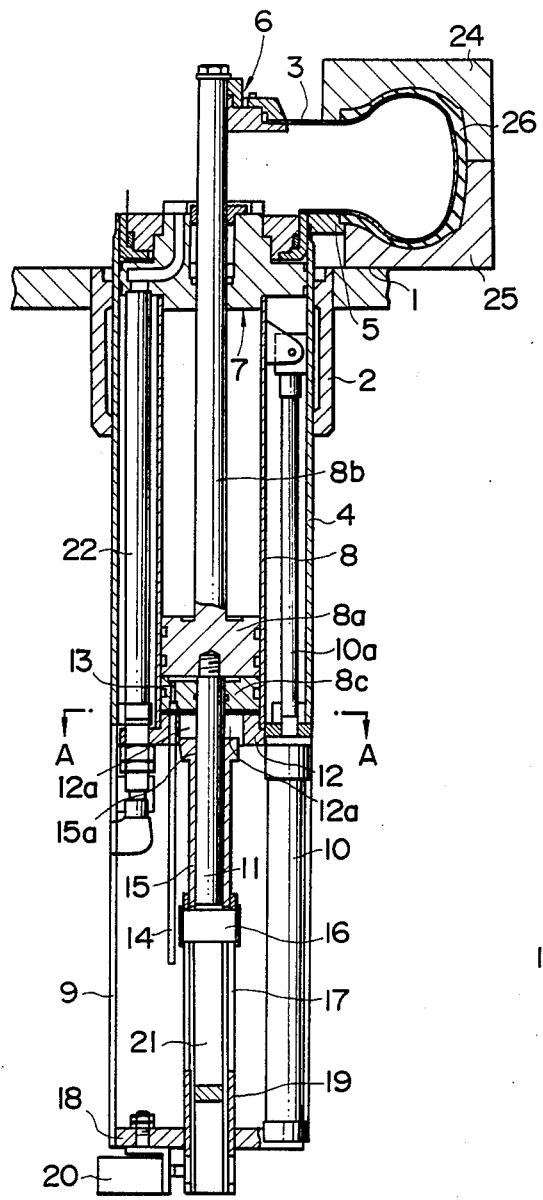
FIG. 2(1)
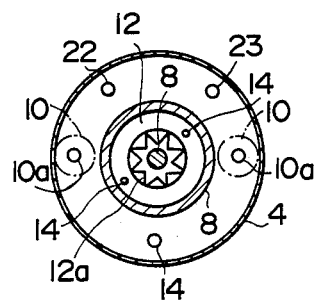
FIG. 2(2)
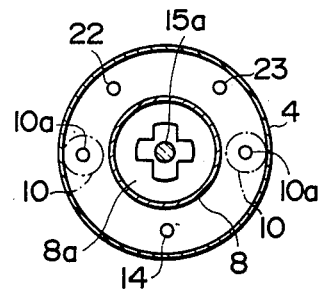

STANDING WELL POST TYPE CENTER MECHANISM IN TIRE PRESS

BACKGROUND OF THE INVENTION (1) Field of the Invention

This invention relates to provision of an improvement in a center mechanism for use in a tire press, particularly a standing well type center mechanism.

(2) Description of the Prior Art

There has been known a tire press for molding and vulcanizing a green tire which comprises a lower mold equipped with a heat source, an upper mold also equipped with a heat source and capable of being opened and closed relative to the lower mold, and a molding bladder capable of being let in and out of a well disposed in the center of the lower mold, and in which a heating and pressurizing medium (steam or the like) is supplied into the bladder to mold and vulcanize the green tire, as for instance disclosed in Japanese Patent Application Laid-Open (KOKAI) No. 61-219606 (1986).

Particularly, the tire press in which the molding bladder is contained in an upright cylinderical form without being folded in the well, as disclosed in the above-mentioned patent application, is called the standing well post type and is becoming the mainstream type of tire press in view of the fact that, in this type, the durability of the molding bladder, formed of rubber or other elastic material, is not degraded.

It is necesssary for the above-mentioned molding bladder to be affixed to the inner surface of the green tire, or be released from the inner surface of the green tire and contained in the upright cylindrical form in the well, or be contracted or expanded in shape according to the operations of setting the green tire in position, shaping the tire and vulcanizing and molding the tire. For carrying out these motions, therefore, a center mechanism comprising a well disposed in the center of the lower mold is used.

In general, as disclosed in the above-mentioned Japanese Patent Application Laid-Open (KOKAI) No. 61-219606 (1986), the center mechanism comprises a bladder well provided with a lower bead ring at the upper end thereof, and upper clamp right assembly for holding the upper end of a molding bladder, and a lower clamp ring assembly for holding the lower end of the molding bladder, the three members being vertically liftable independently of each other. The bladder well, the upper clamp ring assembly and the lower clamp ring assembly are lifted up or down to respective required positions, thereby bringing the bladder into operative movements, and a heating and pressurizing medium such as high-temperature high-pressure steam is supplied into the bladder by heating and pressurizing medium supply means provided in the center mechanism. The upward and downward motions of each of the above-mentioned members required are carried out, without exception, by lift means comprising an oil cylinder and a piston rod disposed in the cylinder, as is know.

The center mechanism of the type as mentioned above involves the following problems.

At the time of vulcanization and molding of the green tire, a large quantity of high-temperature high-pressure steam or the like is supplied continuously into the bladder, and the heat hereof has effects on the entire body of the center mechanism.

The oil cylinders, naturally, are low in resistance to heat and are easily changed in properties when heated. Even if a strict seal structure is applied to the oil cylinders, there remains a high possibility of seal deterioration or leak troubles. To protect the hydraulic oil from heat, therefore, it is necessary to use a large number of pieces of heat insulator for each of the members and at joint and lap portions of the members. The use of the heat insulators, accompanied by a complicated construction and a short lifetime of heat-resistant material, leads to the need for constant inspection and repair.

Furthermore, assured separation of the component parts by heat insulator involves an increase in the number of component parts required. Disposing the oil cylinders for lift operations at locations remote from a heat source leads to an increase in the vertical overall length of the center mechanism, and requires a modification in the design of, for instance, a base on which to mount the center mechanism.

For holding, for instance, the lower clamp ring assembly in a predetermined position against the high-pressure steam supplied into the bladder, the use of the oil cylinder alone is insufficient in capability, and a separate clamp mechanism based on mechanical means is therefore required. Such a means conventionally used comprises lock grooves formed in the peripheral surface of the guide rod or piston rod located in the center of the press, and a pair of locking levers disposed on opposite sides of the guide rod or piston rod, the levers capable of being engaged with the disengaged from the lock grooves. The pair of locking levers are turned by converting a vertical motion into a rotational motion by a slide guide mechanism, and transmitting the rotation to the locking levers in tune through a pinion gear or the like, thereby opening or closing the levers. This system requires a large number of component parts, complicates the design in the limited well, and has a high possibility of troubles occurring therein.

SUMMARY OF THE INVENTION

It is an object of this invention to overcome the problems in the center mechanism mentioned above.

It is another object of this invention to provide a center mechanism for use in a tire press which employs an air cylinder as a moving member for lifting up and down independently an upper clamp ring assemply for holding the upper end of a molding bladder, thereby solving the problems arising from the use of the oil cylinder according to the prior art.

It is a further object of this invention to provide a center mechanism for use in a tire press in which the air cylinder is constrainedly supported by an engageable and disengageable stopper, thereby enabling a simple lock mechanism in place of a conventional locking mechanism and enabling simplification of the required construction in the center mechanism as a whole.

According to this invention, there is provided a standing well post type center mechanism in a tire press which comprises a bladder well disposed vertically liftably in the center of the tire press, the bladder well comprising a bead ring at the upper end thereof, and upper clamp ring assembly for holding the upper end of a bladder, the upper clamp ring assembly disposed concentrically with the bladder well and being vertically liftable independently of the bladder well, and a lower clamp ring assembly concentrical with the upper clamp ring assembly and vertically liftable independently of the bladder well and the upper clamp ring assembly, where in an air cylinder for lifting the upper clamp ring assembly is disposed liftably in the bladder well, the upper clamp right assembly is fitted to the upper end of a piston rod in the air cylinder, the lower clamp ring assembly is fitted to the upper end of the air cylinder, and the lower end of the air cylinder is constrained engageably and disengageably through a stopper.

According to the technical means of this invention, and air cylinder is used as a driving member for upper and lower clamp ring assemblies for letting the molding bladder in and out of the bladder and for letting the molding bladder in and out of the green tire. The lower clamp ring assembly is attached to the air cylinder disposed liftably in the well, and the upper clamp ring assembly is attached to a piston rod disposed independently liftably in the cylinder, whereby the operations of letting in and out the bladder can be controlled in the same manner as in the prior art. In addition, since the oil cylinders used in the prior art are not used according to the invention, the demerit of the poor heat resistance of the oil cylinders is obviated, the need for a complicated construction for heat insulation and protection is eliminated, and the overall cylinder construction is simplified. With the lower end of the air cylinder constrained engageably and disengageably through the stopper, the need for locking a rod by clamp ring levers or the like as in the prior art is eliminated, and an extremely simplified lock structure is realized, which ensures simplicity and a high degree of freedom of designing.

As contrasted to the lifting of the upper and lower clamp ring assemblies by oil cylinders according to the prior art, the center mechanism of this invention uses the liftable air cylinder to hold the lower clamp ring assembly, and holds the upper clamp ring assembly by the piston rod disposed independently liftable in the air cylinder, thereby enabling the clamp ring assemblies to be lifted up or down in connjunction with each other or independently of each other. Thus, the need for the oil cylinders to be protected against high heat or high temperatures is eliminated completely. Therefore, the necessity for complicated heat-insulating constructions for the required members or component parts is eliminated, and marked simplification of the cylinder construction is achieved. In addition, since heat insulators poor in mechanical strength are not used, there is no insecurity as to the function, strength or durability of the cylinder itself, and it is possible to make simpler and compact the center mechanism as a whole.

Besides, the use of the air cylinder instead of the oil cylinder is highly advantageous on a maintenance basis and in view of the reduced number of component parts, the reduced failure rate and the easiness of production.

Moreover, the construction in which the lower end of the air cylinder is supported and constrained engageably and disengageably through the stopper unnecessitates a complicated lock structure, as according to the prior art, for clamping the piston rod or guide rod in the well by opening and closing the lock structure through horizontal turning. Thus, it is enough to provide a simple constraining structure which displays a locking function through mutual lapping and is disengaged through a slight rotational motion, thereby supporting the air cylinder and permitting free movement of the cylinder. The constraining structure is easy to manufacture, is free of possibility of failure, and is advantageous in that the engaging structure is easily designable by utilizing the lower surface of the cylinder.

The above and other objects, features and advantages of this invention will become apparent from the following description and appended claim, taken in conjunction with the accompanying drawings which show by way of example a preferred embodiment of the invention.

BRIEF DESCRIPTION OF THE DRAWINGS

FIG. 1 is a vertical sectional front view of one embodiment of the center mechanism according to this invention, in the vulcanizing and molding stage;

FIGS. 2(1) and 2(2) are each a sectional view taken along line A—A of FIG. 1;

DESCRIPTION OF THE PREFERRED EMBODIMENT

Figure 3:
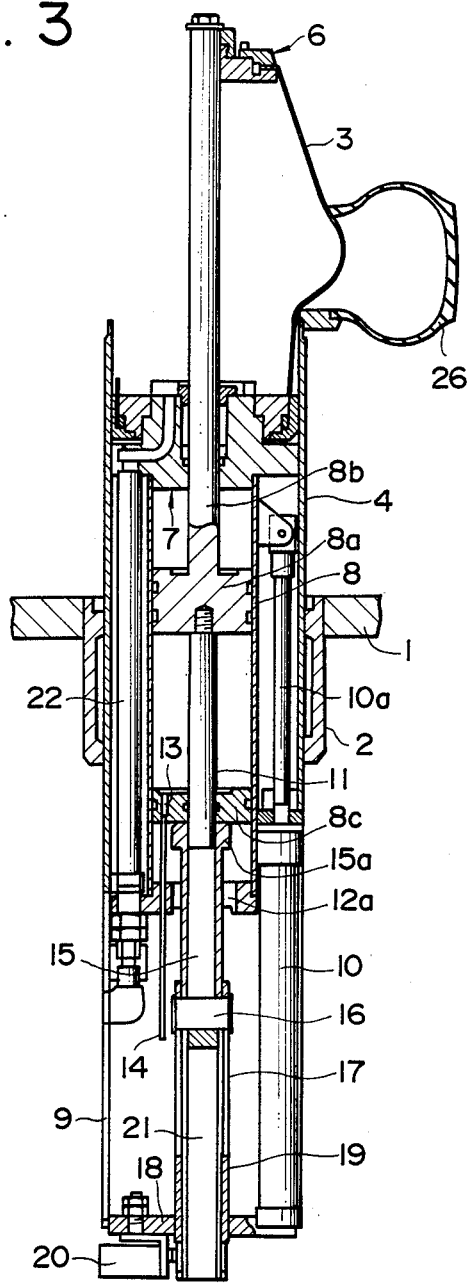
FIG. 3 is a vertical sectional front view of the center mechanism upon completion of the vulcanization.

One suitable embodiment of the center mechanism according to this invention will now be explained while referring to FIGS. 1 to 8.

In FIGS. 1, 2(1) and 2(2), there is shown a tire press (vulcanizing machine), though the entire view thereof is not shown. At the press center position of a press base frame 1 in the tire press, a bladder well 4 for containing a molding bladder 3 in an upright cylinderical form is disposed vertically liftably through a guide sleeve 2 (a lift member is omitted in the figures). A bead ring (lower bead ring) 5 is attached to the upper end of the well 4.

An upper clamp ring assembly 6 for holding the upper end of the molding bladder 3 is disposed concentrically with the bladder well 4 so as to be vertically liftable independently of the well 4. the upper clamp ring assembly 6 is disposed concentrically with a lower clamp ring assembly 7 for holding the lower end of the molding bladder 3 so that both the assemblies 6 and 7 are capable of being vertically lifted independently of each other.

The bladder well 4, the upper clamp ring assembly 6 and the lower clamp ring assembly 7 constitute the center mechanism. Both the movement of the molding bladder 3 into and out of the well 4 and the supply of a heating and pressurizing medium to the inner surface of a green tire are carried out by lifting the well 4 and the assemblies 6 and 7 up or down in conjunction with each other or independently of each other. In this standing well post type center mechanism, according to the invention, an air cylinder 8 is attached to the lower clamp ring assembly 7 for holding the lower end of the molding bladder 3, as shown.

Namely, the upper end of the air cylinder 8 is attached to the lower end of the lower clamp ring assembly 7, and a piston rod 10a in a lifting cylinder 10 disposed on the side of a center mechanism main cylinder 9 integral with the bladder well 4 is connected to the air cylinder 8, thereby enabling the air cylinder 8 to lift the lower clamp ring assembly 7 independently.

A piston rod 8b of a piston 8a disposed to be liftable independently of the lifting of the cylinder 8 is slidably passed through the lower clamp ring assembly 7, with the upper clamp ring assembly 6 attached to the upper end of the rod 8b.

To enable the piston rod 8b to be lifted independently of the air cylinder 8, in the embodiment, a guide rod 11 is protruded downward from the lower surface of the piston 8a concentrically with the piston rod 8b, whereas a sub-piston 8c is slidably fitted on the rod 11 between the piston 8a and a cylinder head 12 constituting the lower end of the air cylinder 8, and the sub-piston 8c, is provided with an inlet/outlet port 13 and an inlet/outlet pipe 14 for pressurized air acting on the lower surface of the piston 8a.

Furthermore, according to the invention, a stopper for supporting the lower surface of the cylinder head 12 constituting the lower end of the air cylinder 8 and for constraining the cylinder head 12 engageably and disengageably is provided which comprises an upper stopper 15 and a lower stopper 17 connected with the stopper 15 in a body by a stopper pin 16. The stopper is turnably fitted over the guide rod 11. The lower stopper 17 is held by a holder 19 of a bracket 18 provided on the side of the center mechanism main cylinder 9. The stopper is capable of being turned forward and reversely by a turning member 20, such as a cylinder, provided on the side of the bracket 18.

A structure for constraining the cylinder head 12, which constitutes the lower end of the air cylinder 8, engageably and disengageably through the stoppers 15 and 17 is not particularly limited but may be designed freely. For example, the constraining structure may have a construction wherein an engaging portion 15a is provided in engagement with the upper end of the upper stopper 15, whereas the cylinder head 12 is provided with an engaging portion 12a permitting the engaging portion 15a to pass therethrough, and the engaging portions 12a and 15a are each provided with a plurality of lock claws or the like overlapping engageable with each other so that when the lock claws are overlappingly engaged with each other, the engaging portion 12a is constrained to be unable to pass through the engaging portion 15a, whereas when the lock claws are disengaged from each other by slight turning, the engaging portion 12a is released from the constraint relative to the engaging portion 15a and permitted to pass through the engaging portion 15a.

In the embodiment, the guide rod 11 is provided with a notch 21, whereas the lower clamp ring assembly 7 is provided, as conventionally known, with an inlet pipe 22 and an outlet pipe 23 for the heating and pressurizing medium such as steam, on the side of a clamp ring hub.

According to the embodiment as mentioned above, control operations on the molding bladder 3 are conducted as illustrated by FIGS. 3 to 8.

FIG. 1 shows a vulcanizing and moding stage. As shown in the figure, a green tire 26 is loaded in openable upper and lower molds 24 and 25 through mold closure, with the bladder 3 affixed to the inner surface of the tire. The green tire 26 is vulcanized and molded through the supply of the heating and pressurizing medium such as steam via the inlet and outlet pipes 22 and 23 provided on the side of the center mechanism. The upper and lower clamp ring assemblies 6 and 7 and the bead ring 5 are located at the positions shown. The piston rod 8b, piston 8a, sub-piston 8c and guide rod 11 are located at the respective lowered positions. The engaging portion 15a of the upper stopper 15 is in the position for engagement with the engaging portion 12a of the cylinder head 12, and the air cylinder 8 is in the state of being constrained to the vulcanizing and molding position shown in the figure.

FIG. 3 shows the condition upon completion of the vulcanization. When the vulcanization is over, the upper mold 24 is opened and retracted, and the tire 26 with the bladder 3 affixed to the inner surface thereof is released from the lower mold 25 up to the position shown by an upward movement of the well 4 alone.

Next, the upper stopper 15 is turned to release the engaging portion 15a thereof and the engaging portion 12a of the cylinder head 12 of the air cylinder 8 from the constraint. Pressurized air is supplied from the side of the sub-cylinder 8c to the lower surface of the piston 8a to move the piston rod 8b and the upper clamp ring assembly 6 upward as shown, and the piston rod 10a in the lifting cylinder 10 is lowered to move the lower clamp ring assembly 7 downward, whereby the bladder 3 is released spreadingly from the inner surface of the tire 26 and drawn out in upward and downward directions. In this case, the air cylinder 8 is capable of being lowered freely.

Figure 4:
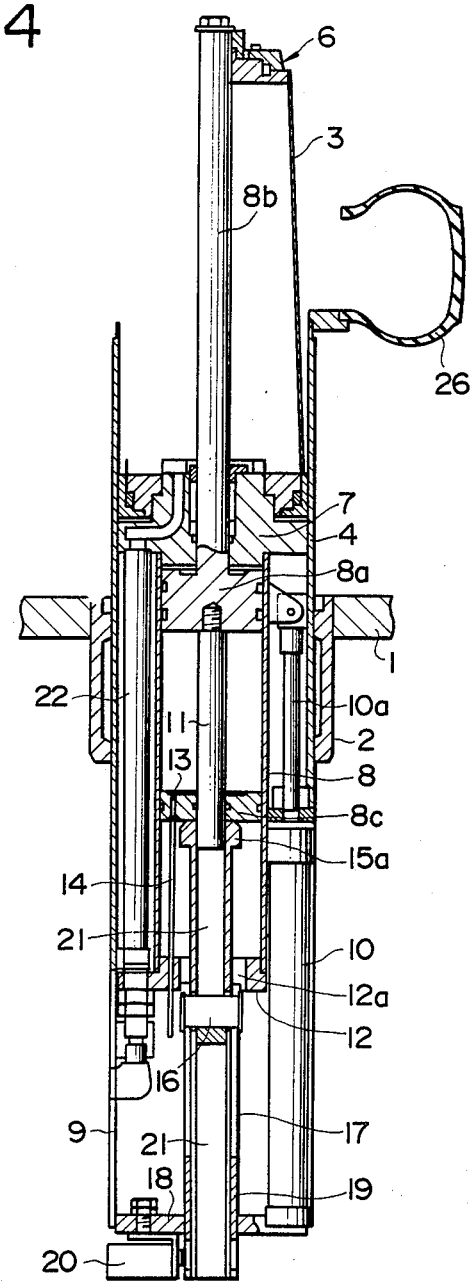
FIG. 4 is a vertical sectional front view of the center mechanism, with the lower clamp ring assembly is lowered.
Figure 5:
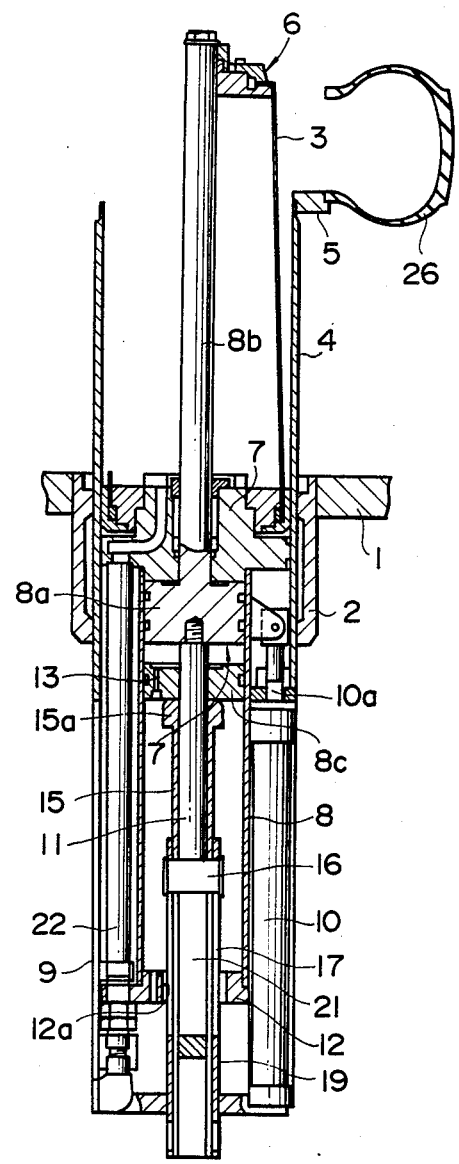
FIG. 5 is a vertical sectional front view of the center mechanism, before the lower bead ring is lowered.

In FIG. 4, the air cylinder 8 is lowered by the further downward movement of the piston rod 10a in the lifting cylinder 10, and the lower clamp ring assembly 7 is jointed to the piston 8a of the air cylinder 8. The bladder 3 is erected outside the tire 26 in a wholly upright cylindrical form. The sub-piston 8c is fastened to the engaging portion 15a of the upper stopper 15, and the guide rod 11 is locked to the stopper pin 16. In FIG. 5, the well 4 and the lower bead ring 5 are still left at their raised positions, whereas the piston rod 10a in the lifting cylinder 10 is lowererd to a position near the bottom dead center. The pressurized air supplied from the side of teh sub-piston 8c is discharged, and the upper clamp ring assembly 6 is lowered in conjunction with the further downward movement of the air cylinder 8, lower clamp ring assembly 7 and piston 8a. As shown in the figure, however, the lower bead ring 5 and the bladder 3 are in the condition of interfering with the tire 26, so that it is possible to take out the tire 26 smoothly.

Figure 6:
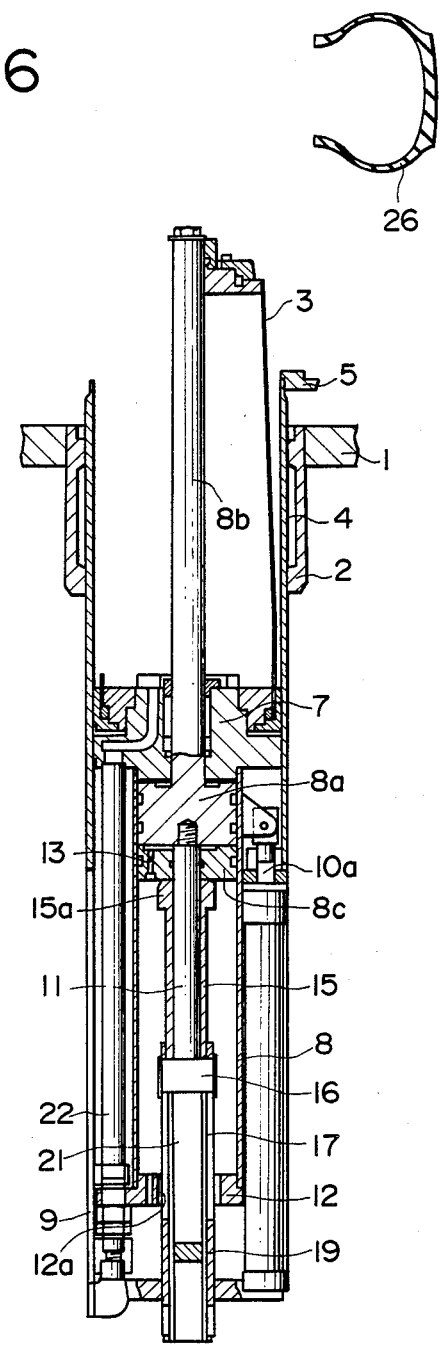
FIG. 6 is a vertical sectional front view of the center mechanism, in the post-in-well condition.

Therefore, as shown in FIG. 6, the well 4 is lowered to return the lower bead ring 5 to an original position thereof, and the piston rod 10a in the lifting cylinder 10 is lowered to the bottom dead center, whereby the upper clamp ring asembly 6 is also lowered to below the tire 26. This results in containment of the bladder 3 into the well 4 in a standing pose, namely, a post-in-well condition, where there is no trouble in taking out the tire 26.

Figure 7:
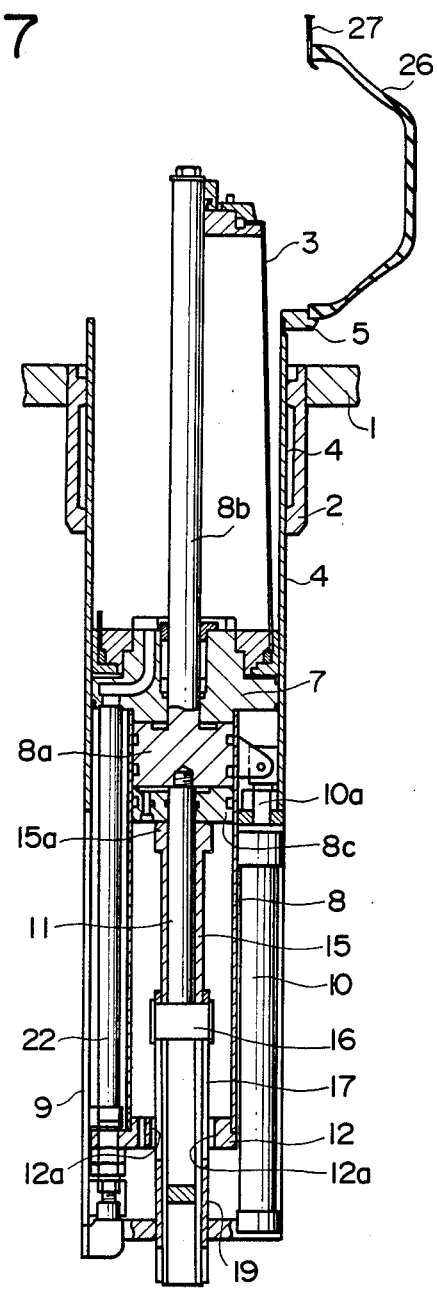
FIG. 7 is a vertical sectional front view of the center mechanism, with a green tire introduced.
Figure 8:
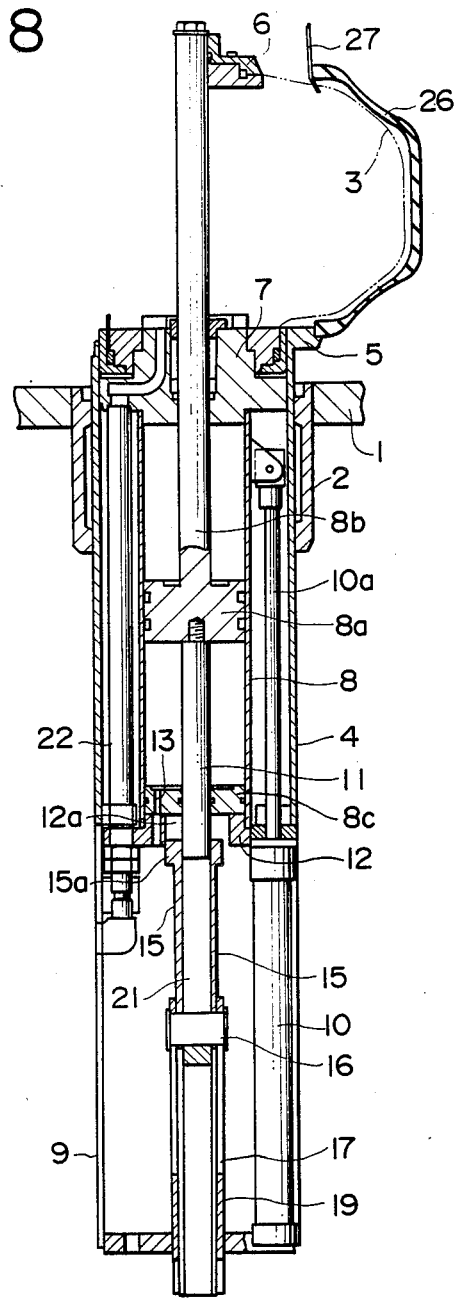
FIG. 8 is a vertical sectional front view of the center mechanism, before shaping.

FIG. 7 shows the condition where, after removal of the vulcanized tire, a new green tire 26 is fed to and set on the lower bead ring 5 (at the same level as the lower mold 25) at the upper end of the well located in the lowered position thereof. FIG. 8 shows the condition before the start of shaping of the green tire introduced (the shaping means the step of inflating the green tire 26 from the inside by use of the bladder 3 and the heating and pressurizing medium to enable easy fitting of the tire into the mold).

Namely, starting from the condition of FIG. 7, the piston rod 10a in the lifting cylinder 10 is moved upward to lift the air cylinder 8 upward, and the lower clamp ring assembly 7 is set at the same level as those of the lower bead ring 5 and the lower mold (not shown). The piston 8a is solely moved upward to lift the upper clamp ring assembly 6 to the position shown, thereby deforming the bladder 3 into the shape for the shaping, as indicated by the chain line in FIG. 8. The engaging portion 12a of the cylinder head 12 in the air cylinder 8 and the engaging portion 15a of the upper stopper 15 are engaged with each other and held in the restrained condition (the air cylinder 8 is held in the position shown, during both the shaping process and the vulcanizing and molding process), and the operation is transferred from the shaping process to the vulcanizing and molding process, with the piston 8a returned to the position shown in FIG. 1. In FIGS. 7 and 8, numeral 27 denotes a tire loader.

What is claimed is:

1. A standing well post type center mechanism in a tire press which comprises a bladder well disposed vertically liftably in the center of the tire press, the bladder well comprising a bead ring at the upper end thereof, an upper clamp ring assembly for holding the upper end of a bladder, the upper clamp ring assembly disposed concentrically with the bladder well and being vertically liftable independently of the bladder well, and a lower clamp ring assembly concentrical with the upper clamp ring assembly and vertically liftable independently of the bladder well and the upper clamp ring assembly.

wherein an air cylinder for lifting the upper clamp ring assembly is disposed liftably in the bladder well, the upper clamp ring assembly is fitted to the upper end of a piston rod in the air cylinder, the lower clamp ring assembly is fitted to the upper end of the air cylinder, and the lower end of the air cylinder is constrained engageably and disengageably through a stopper.

* * * * *

UNITED STATES PATENT AND TRADEMARK OFFICE
CERTIFICATE OF CORRECTION

PATENT NO. : 4,950,141
DATED : AUGUST 21, 1990
INVENTOR(S) : YOSHIMATA MAIKUMA ET AL.

It is certified that error appears in the above-identified patent and that said Letters Patent is hereby corrected as shown below:

On the first page, under the abstract, please delete "6 Drawing Sheets" and insert --7 Drawing Sheets--.

Signed and Sealed this

Tenth Day of December, 1991

Attest:

HARRY F. MANBECK, JR.

*Attesting Officer*      *Commissioner of Patents and Trademarks*